United States Patent
Cheong et al.

(10) Patent No.: US 7,931,946 B2
(45) Date of Patent: Apr. 26, 2011

(54) LIQUID CRYSTAL COMPOUND CONTAINING SULFONE GROUP, LIQUID CRYSTAL COMPOSITION COMPRISING THE SAME, AND OPTICAL FILM USING THE SAME LIQUID CRYSTAL COMPOSITION

(75) Inventors: Jae-Ho Cheong, Daejeon (KR); Min-Jin Ko, Daejeon (KR); Myung-Sun Moon, Daejeon (KR); Bum-Gyu Choi, Daejeon (KR); Dae-Ho Kang, Daejeon (KR); Ki-Youl Lee, Daejeon (KR); Yun-Bong Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/448,874

(22) PCT Filed: Jan. 22, 2008

(86) PCT No.: PCT/KR2008/000387
§ 371 (c)(1),
(2), (4) Date: Jul. 13, 2009

(87) PCT Pub. No.: WO2008/091090
PCT Pub. Date: Jul. 31, 2008

(65) Prior Publication Data
US 2010/0096590 A1    Apr. 22, 2010

(30) Foreign Application Priority Data
Jan. 23, 2007  (KR) ........................ 10-2007-0007217

(51) Int. Cl.
G02B 5/00     (2006.01)
C09K 19/30    (2006.01)
C09K 19/34    (2006.01)
C09K 19/12    (2006.01)
C09K 19/20    (2006.01)
C07D 303/02   (2006.01)
C07C 317/14   (2006.01)
C07C 311/15   (2006.01)

(52) U.S. Cl. ............... 428/1.1; 252/299.01; 252/299.61; 252/299.63; 252/299.66; 252/299.67; 549/521; 549/551; 560/11; 560/12

(58) Field of Classification Search ............. 252/299.01, 252/299.66, 299.67, 299.61, 299.63; 549/512, 549/521, 551; 560/11, 12; 428/1.1
See application file for complete search history.

(56) References Cited

U.S. PATENT DOCUMENTS
3,748,132 A * 7/1973 Arcesi et al. ................ 430/281.1
5,517,350 A * 5/1996 Cabrera et al. ................ 359/326

FOREIGN PATENT DOCUMENTS
JP     17113108 A    4/2005

OTHER PUBLICATIONS

He, Guang S. et al; "Tunable two-photon pumped lashing using a holographic polymer-dispersed liquid-crystal grating as a distributed feedback element", Applied Physics Letters (2003), 83(14), pp. 2733-2735, CODEN: APPLAB; ISSN: 0003-6951 & none See the abstract.

Kim, Sehoon et al; "Thermotrophic Polymethacrylate Bearing Sulfonylbenzoxazole-Based Multifunctional Photoactive Mesogen", Macromolecules (2001), 34(12), pp. 3947-3953, CODEN: MAMOBX; ISSN: 0024-9297 & none See the abstract.

* cited by examiner

Primary Examiner — Shean C Wu
(74) Attorney, Agent, or Firm — McKenna Long & Aldridge LLP

(57) ABSTRACT

Disclosed are a novel liquid crystal compound containing a sulfone group, a liquid crystal composition comprising the same, and an optical film using the same liquid crystal composition. More particularly, there are provided a liquid crystal material for a viewing angle compensation film with high quality characteristics, which can improve a contrast ratio measured at a tilt angle to the front and minimize variations in color with viewing angles in a black state, a liquid crystal composition comprising the same liquid crystal material, and a compensation film obtained from the same liquid crystal composition.

14 Claims, 1 Drawing Sheet

LIQUID CRYSTAL COMPOUND CONTAINING SULFONE GROUP, LIQUID CRYSTAL COMPOSITION COMPRISING THE SAME, AND OPTICAL FILM USING THE SAME LIQUID CRYSTAL COMPOSITION

This application is a national phase entry of International Application No. PCT/KR2008/000387, filed Jan. 22, 2008 and claims priority to Korean Patent Application No. 10-2007-007217, filed Jan. 23, 2007, both of which are hereby incorporated by reference in their entirety.

TECHNICAL FIELD

The present invention relates to a liquid crystal compound containing a sulfone group, a liquid crystal composition comprising the same, and an optical film using the same liquid crystal composition. More particularly, the present invention relates to a liquid crystal material for a viewing angle compensation film with high quality characteristics, which can improve a contrast ratio and minimize variations in color with viewing angles in a black state, a liquid crystal composition comprising the same, and a compensation film fabricated from the same liquid crystal composition.

BACKGROUND ART

Recently, as markets on watches, notebook PCs, cellular phones, televisions and monitors have been tremendously extended, the demand for displays of low weight and low power consumption has been greatly increased. A liquid crystal display (LCD), which is light and thin and requires low power consumption, has been widely applied to such products.

However, an LCD has a disadvantage of viewing angle dependency. In other words, an LCD shows variations in color or light/darkness depending on viewing directions or angles. Also, as a size of such an LCD increase, a viewing angle decreases. As compared to a conventional CRT (cathode ray tube) device having a viewing angle of about 180°, a TFT-LCD with no viewing angle compensation shows a viewing angle of merely about ±50°.

In order to solve the above described problems, various methods have been used, such methods including a multi-domain method in which pixels are divided in liquid crystal cells to control liquid crystal alignment, a method of controlling voltage, and a method of utilizing an optical compensation film.

The above-mentioned viewing angle dependency of an LCD is caused by the incident light having a tilt angle to an LCD panel, which shows a birefringence effect different from that of the vertical incident light. In order to compensate for this, a method of using an optical compensation film has been widely used, in which retardation films having opposite birefringence indexes to a panel are attached onto both surfaces of the panel. Also, as the size of a display panel has increased, a high-quality liquid crystal compensation film has been needed.

A retardation film is obtained by coating an aligned transparent support with liquid crystal, and aligning the liquid crystal along a predetermined direction to the direction of an aligning layer, followed by curing. After aligning, the liquid crystal has a direction opposite to the direction of liquid crystal cells upon application of voltage, so that light leakage in a black state can be minimized. When such retardation films are combined with a liquid crystal panel so that light is allowed to penetrate through the panel, it is possible to compensate for a light phase difference caused by a difference of light paths because paths of the incident light are similar to each other in all directions. In addition, it is also possible to perform compensation of a difference in birefringence indexes in upper/lower/left/right directions by optimizing the magnitude of birefringence of each film, an angle formed between films, a rubbing direction and an angle to a polarizer.

Therefore, there is a need for a new liquid crystal compound used for manufacturing a viewing angle compensation film having high-quality characteristics of improving a contrast ratio, and minimizing color variations in a black state depending on viewing angles.

DISCLOSURE OF THE INVENTION

Therefore, the present invention has been made in view of the above-mentioned problems, and provides a novel compound useful as a material for a viewing angle compensation film that can improve a contrast ratio and minimize variations in color with viewing angles in a black state.

Also, the present invention provides a liquid crystal composition comprising such a compound, and an optical film using the same liquid crystal composition.

In accordance with an aspect of the present invention, there is provided a novel liquid crystal compound containing a sulfone group. In accordance with another aspect of the present invention, there is provided a liquid crystal composition comprising the above liquid crystal compound containing a sulfone group, and an optical film using the same liquid crystal composition. In accordance with yet another aspect of the present invention, there is provided a liquid crystal display including the above optical film.

The novel liquid crystal compound containing a sulfone group according to the present invention is a compound represented by the following Formula 1:

[Formula 1]

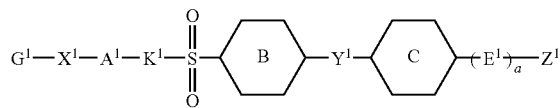

In Formula 1, $G^1$ is

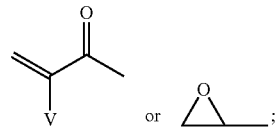

V is —H, —$CH_3$, —$CH_2CH_3$, —F, —Cl, —Br, or —$CF_3$;
$X^1$ is —O—, —NH—, a $C_1$~$C_{12}$ alkylene, or a single bond;
$A^1$ is a $C_1$~$C_{12}$ alkylene, a $C_2$~$C_{12}$ alkenylene, —$(CH_2CH_2O)_n$—, —$(CH_2CHCH_3O)_n$—, or —$(CHCH_3CH_2O)_n$—, and n is an integer of 1 to 5;
$K^1$ is —O—, —NH—, a $C_1$~$C_{12}$ alkylene, or a single bond;
$Y^1$ is —O—, —NH—, a $C_1$~$C_{18}$ alkylene, —CH=CH—, —C≡C—, —$(CH_2)_oC(=O)O(CH_2)_p$—, —$(CH_2)_oOC(=O)(CH_2)_p$—, —$(CH_2)_oC(=O)(CH_2)_P$—, —$(CH_2)_oC(=O)NH(CH_2)_p$—, —$(CH_2)_oNHC(=O)(CH_2)_p$—, or a single bond;
o and p are each independently an integer of 0 to 2;

$B$ is 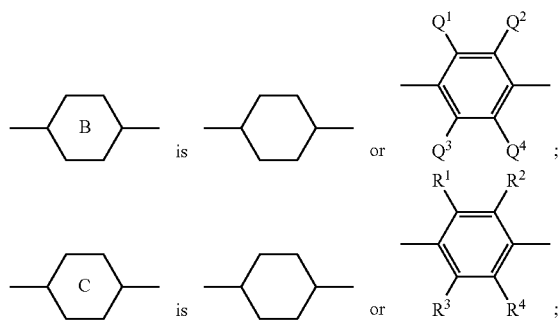

$C$ is $E^1$ is

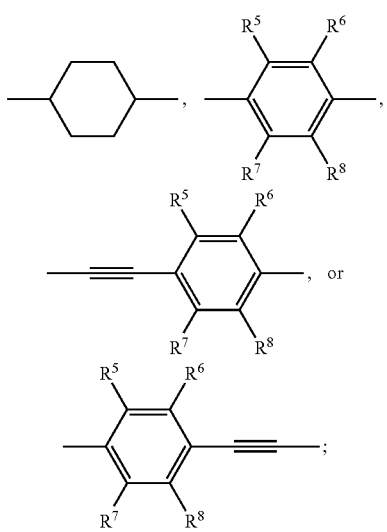

a is an integer of 0 to 2;

$Q^1 \sim Q^4$ and $R^1 \sim R^8$ are each independently —H, —F, —Cl, —Br, —I, —CN, —OH, —CH$_3$, —CH$_2$CH$_3$, —CF$_3$, or —C(=O)CH$_3$; and $Z^1$ is —H, —F, —Cl, —Br, —I, —CF$_3$, —CN, —OH, —OCH$_3$, —OCH$_2$CH$_3$, —OCF$_3$, a $C_1 \sim C_{12}$ alkyl, or a $C_2 \sim C_{12}$ alkenyl.

Also, the novel liquid crystal compound containing a sulfone group according to the present invention is a compound represented by the following Formula 2:

[Formula 2]

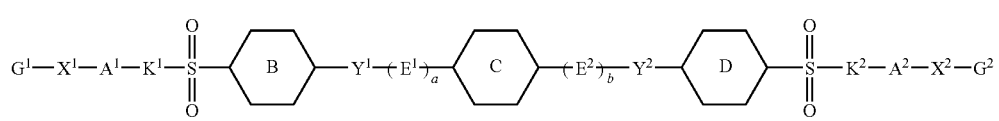

In Formula 2, $G^1$ and $G^2$ are each independently

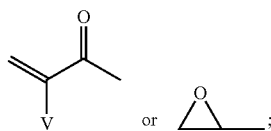

V is —H, —CH$_3$, —CH$_2$CH$_3$, —F, —Cl, —Br, or —CF$_3$;

$X^1$ and $X^2$ are each independently —O—, —NH—, a $C_1 \sim C_{12}$ alkylene, or a single bond;

$A^1$ and $A^2$ are each independently a $C_1 \sim C_{12}$ alkylene, a $C_2 \sim C_{12}$ alkenylene, —(CH$_2$CH$_2$O)$_n$—, —(CH$_2$CHCH$_3$O)$_n$—, or —(CHCH$_3$CH$_2$O)$_n$—, and n is an integer of 1 to 5;

$K^1$ and $K^2$ are each independently —O—, —NH—, a $C_1 \sim C_{12}$ alkylene, or a single bond;

$Y^1$ and $Y^2$ are each independently —O—, —NH—, a $C_1 \sim C_{18}$ alkylene, —CH=CH—, —C≡C—, —(CH$_2$)$_o$C(=O)O(CH$_2$)$_p$—, —(CH$_2$)$_o$OC(=O)(CH$_2$)$_p$—, —(CH$_2$)$_o$C(=O)(CH$_2$)$_p$—, —(CH$_2$)$_o$C(=O)NH(CH$_2$)$_p$—, —(CH$_2$)$_o$NHC(=O)(CH$_2$)$_p$—, or a single bond;

o and p are each independently an integer of 0 to 2;

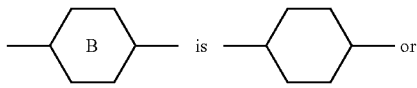

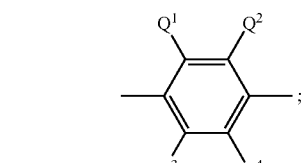

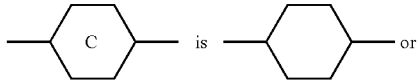

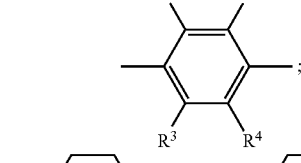

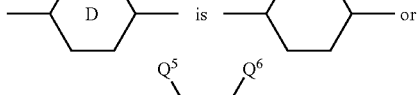

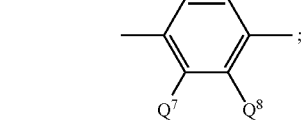

$E^1$ and $E^2$ are each independently

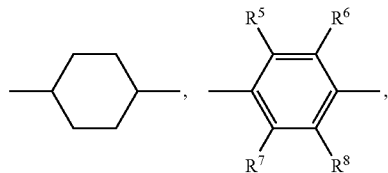

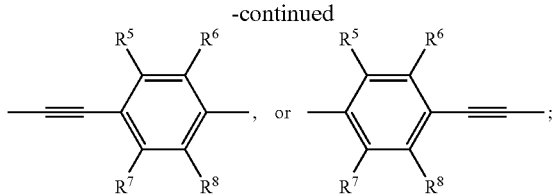

a and b are each independently an integer of 0 to 2; and $Q^1 \sim Q^4$ and $R^1 \sim R^8$ are each independently —H, —F, —Cl, —Br, —I, —CN, —OH, —CH$_3$, —CH$_2$CH$_3$, —CF$_3$, or —C(=O)CH$_3$.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
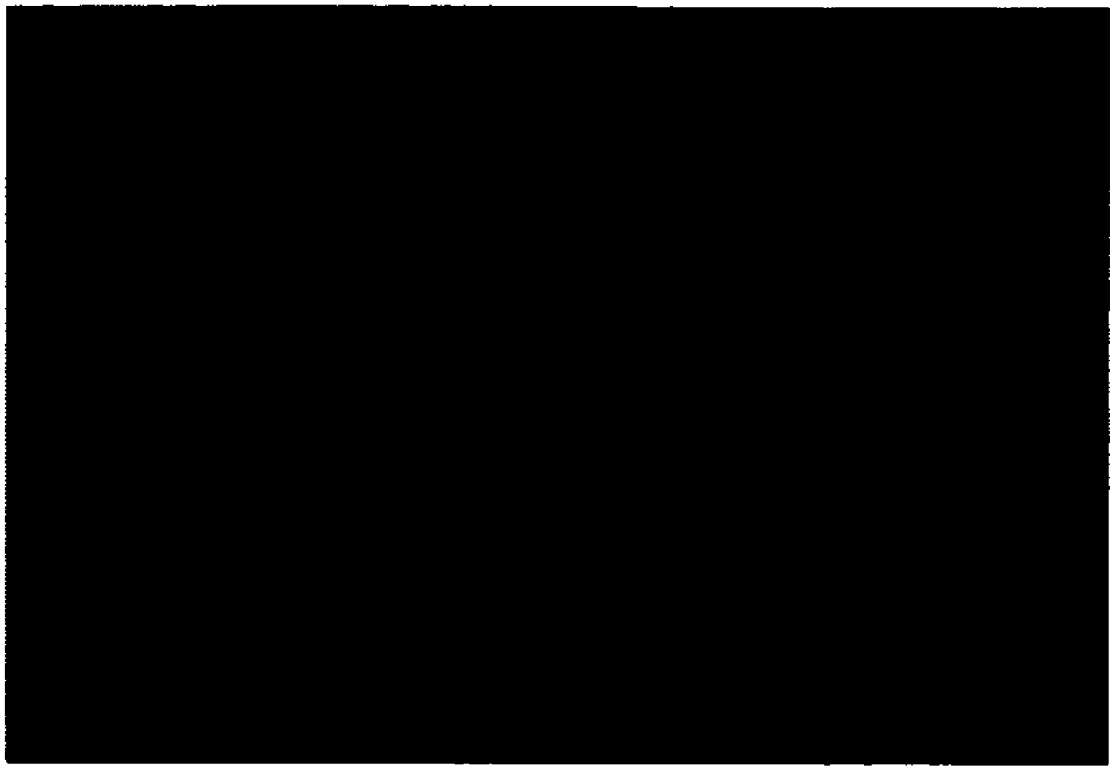
FIG. 1 is a photograph taken by a polarizing microscope in a black state when a compensation film manufactured according to Example 6 of the present invention is used.

The inventive compound represented by Formula 1 and the inventive compound represented by Formula 2 are polymerizable liquid crystal compounds.

More specially, the inventive compound represented by Formula 1 is a compound in which a polymerizable group as a substituent is introduced into one end of a mesogenic core. Also, the inventive compound represented by Formula 2 is a compound in which a polymerizable group as a substituent is introduced into either end of a mesogenic core. However, when a polymerizable group is directly attached to a mesogenic core, it is difficult to maintain an alignment state in polymerization. Therefore, a linking group is introduced between the mesogenic core and the polymerizable group.

In Formula 1, SO$_2$-ring B—Y$^1$-ring C-(E$^1$)$_a$-Z$^1$ is the mesogenic core, G$^1$ corresponds to the polymerizable group, and X$^1$-A$^1$-K$^1$ corresponds to the linking group. Also, in Formula 2, SO$_2$-ring B—Y$^1$-(E$^1$)$_a$-ring C-(E$^2$)$_b$-Y$^2$-ring D-SO$_2$ is the mesogenic core, G$^1$ and G$^2$ each correspond to the polymerizable group, and X$^1$-A$^1$-K$^1$ and X$^2$-A$^2$-K$^2$ each correspond to the linking group.

In this way, by introducing SO$_2$ into the compound represented by Formula 1 and the compound represented by Formula 2 respectively, the workability (physical properties) of the liquid crystal compound can be improved.

Each of the inventive compound represented by Formula 1 and the inventive compound represented by Formula 2 is easily mixed with various liquid crystal materials, and has high solubility even at a low temperature. Further, each of the inventive compounds is physically/chemically stable and has good heat/light stability under the conditions where a liquid crystal display is usually used, and can be a superior material constituting a liquid crystal composition because it forms a liquid crystal mesophase at a preferred range of temperatures. Further, a conventional liquid crystal composition shows a tendency to be precipitated as crystals at room temperature, but a liquid crystal composition comprising the inventive compound represented by Formula 1 or the inventive compound represented by Formula 2 does not show such crystal precipitation, even when kept for a week or more.

Therefore, the compounds represented by Formulas 1 and 2 are liquid crystal compounds applicable to an optical film that improves a wide viewing angle characteristic in a variety of liquid crystal displays.

In Formulas 1 and 2, the $C_2 \sim C_{12}$ alkenylene as $A^1$ and the $C_2 \sim C_{12}$ alkenylene as $A^2$ may be each independently selected from the group consisting of —CH=CH—, —CH=CCH$_3$—, —CH$_2$CH=CH—, —CH=CHCH$_2$CH$_2$—, —CH$_2$CH=CHCH$_2$—, —CH$_2$CH$_2$CH=CH—, —CH=CHCH$_2$CH$_2$CH$_2$—, —CH$_2$CH=CHCH$_2$CH$_2$—, —CH$_2$CH$_2$CH=CHCH$_2$—, and —CH$_2$CH$_2$CH$_2$CH=CH—.

Also, in Formula 1, the $C_2 \sim C_{12}$ alkenyl as $Z^1$ may be selected from the group consisting of —CH=CH$_2$, —CH=CHCH$_3$, —CH$_2$CH=CH$_2$, —CH=CHCH$_2$CH$_3$, —CH$_2$CH=CHCH$_3$, —CH$_2$CH$_2$CH=CH$_2$, —CH=CHCH$_2$CH$_2$CH$_3$, —CH$_2$CH=CHCH$_2$CH$_3$, —CH$_2$CH$_2$CH=CHCH$_3$, and —CH$_2$CH$_2$CH$_2$CH=CH$_2$.

In the compound represented by Formula 1, when $A^1$ is alkenylene, or ring B, ring C and/or $E^1$ is/are cyclohexylene, the compound represented by Formula 1 may be a stereoisomer. Further, in the compound represented by Formula 2, when $A^1$ and/or $A^2$ is/are alkenylene, or ring B, ring C, ring D, $E^1$ and/or $E^2$ is/are cyclohexylene, the compound represented by Formula 2 may be a stereoisomer.

Among the compounds represented by Formulas 1 and 2, the compound that may be a stereoisomer in this way is preferably a trans isomer showing liquid crystallinity, and the ratio of a trans isomer: a cis isomer may be 85:15 to 100:0.

More specially, the compounds represented by Formulas 1 and 2 may be expressed by the following exemplary compounds, but the scope of the present invention is not limited thereto:

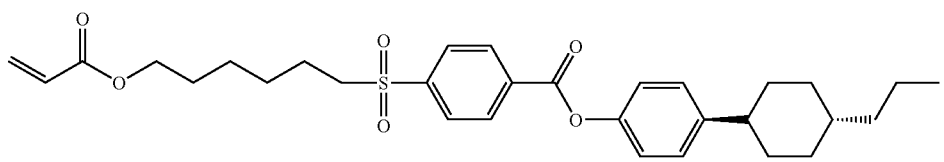

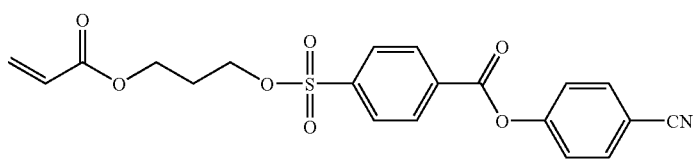

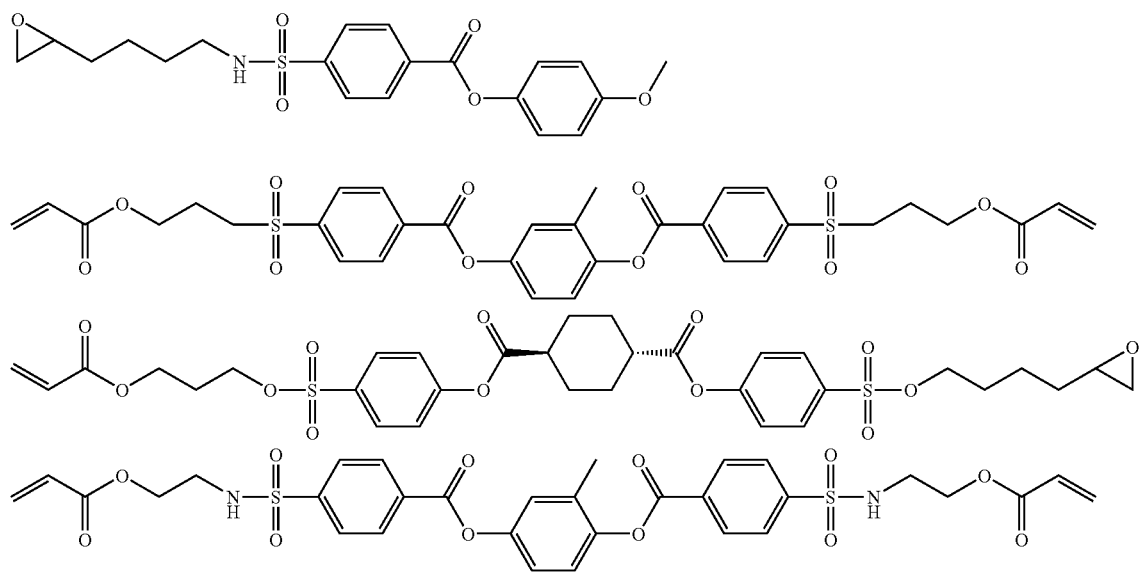

Reference will now be made to methods of preparing the compounds represented by Formulas 1 and 2, in connection with the following reaction schemes.

The inventive compound represented by Formula 1 may be prepared by way of the following Reaction Scheme 1:

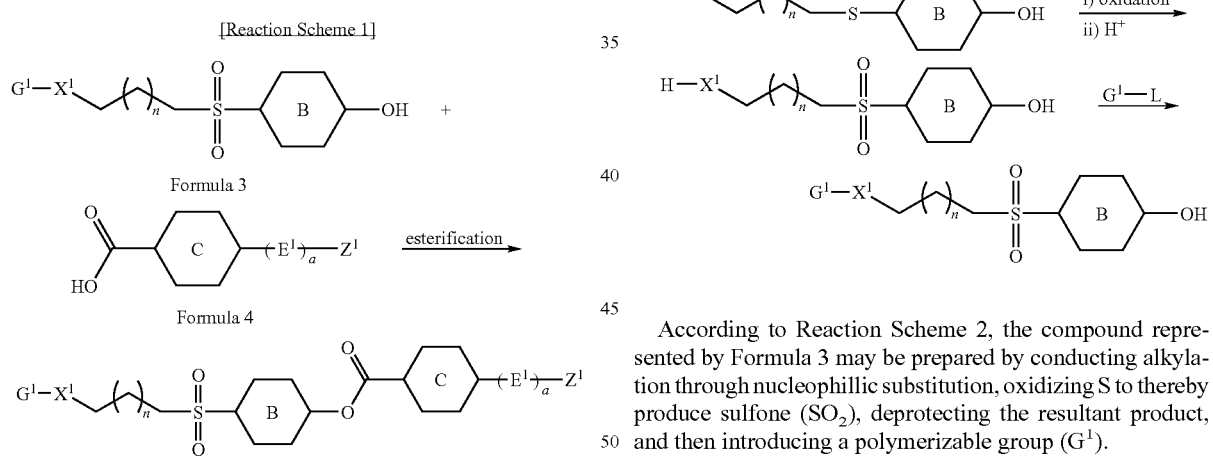

The compound represented by Formula 1 may be synthesized by esterification of the compound represented by Formula 3 and the compound represented by Formula 4. In the esterification, DCC (dicyclohexylcarbodiimide), EDC (1-ethyl-3-(3-(dimethylamino) propyl)carbodiimide), $SOCl_2$, $COCl_2$, MsCl (mesyl chloride), or the like may be used as a reagent, but the present invention is not limited thereto, and other reagents well known in the art may also be used. In Reaction Scheme 1, $G^1$, $X^1$, $E^1$, a, $Z^1$, ring B, and ring C are as defined above in Formula 1, and n is an integer of 1 to 10.

The compound represented by Formula 3 in Reaction Scheme 1 may be prepared by way of the following Reaction Scheme 2:

According to Reaction Scheme 2, the compound represented by Formula 3 may be prepared by conducting alkylation through nucleophillic substitution, oxidizing S to thereby produce sulfone ($SO_2$), deprotecting the resultant product, and then introducing a polymerizable group ($G^1$).

In Reaction Scheme 2, L is a leaving group, and its non-limiting examples include a halide, mesylate (—$OSO_2CH_3$), tosylate (—$OSO_2C_6H_4$-p-$CH_3$), or the like, but the present invention is not limited thereto. Also, P is a protecting group, and its non-limiting example include THP (tetrahydropyranyl), TBS (t-butyldimethylsiltl), etc., but other protecting groups generally known in the art may also be used without any particular limitation.

In Reaction Scheme 2, non-limiting examples of a reagent for the oxidation of S to sulfone ($SO_2$) include mCPBA (m-chloroperbenzoic acid) and the like, but the present invention is not limited thereto, and other reagents generally known in the art may also be used. Also, $G^1$, $X^1$, and ring B are as defined above in Formula 1, and n is an integer of 1 to 10.

The inventive compound represented by Formula 2 may be prepared by way of the following Reaction Scheme 3:

[Reaction Scheme 3]

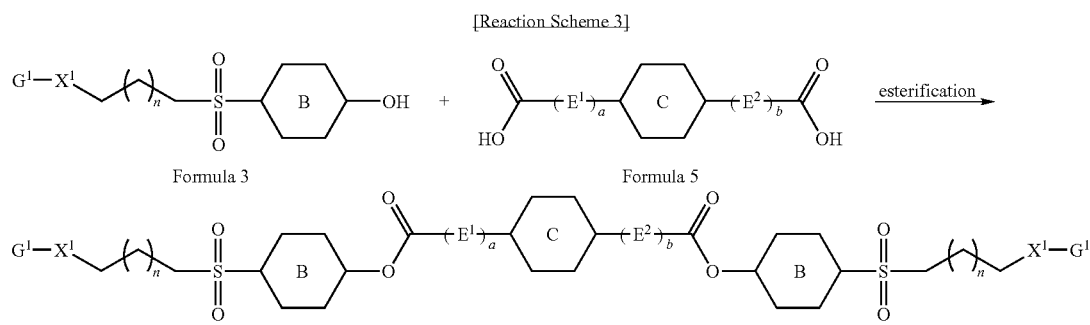

The compound represented by Formula 2 may be synthesized by esterification of the compound represented by Formula 3 and the compound represented by Formula 5. In the esterification, DCC, EDC, $SOCl_2$, $COCl_2$, MsCl, or the like may be used as a reagent, but the present invention is not limited thereto, and other reagents well known in the art may also be used.

In Reaction Scheme 3, $G^1$, $X^1$, $E^1$, $E^2$, ring B, ring C, a, and b are as defined above in Formula 2, and n is an integer of 1 to 10.

The above-mentioned methods of preparing the compounds represented by Formulas 1 and 2 also cover preparation methods via similar reaction paths to Reaction Schemes 1 to 3.

The present invention also provides a liquid crystal composition comprising the compound represented by Formula 1 and/or the compound represented by Formula 2.

The compound represented by Formula 1 and/or the compound represented by Formula 2 included in the liquid crystal composition of the present invention may be a compound containing a stereoisomer. With regard to this, the stereo isomer-containing compound is preferably a trans isomer showing liquid crystallinity, and the ratio of a trans isomer: a cis isomer may 85:15 to 100:0.

The compound represented by Formula 1 and the compound represented by Formula 2 may be each independently included in the liquid crystal composition in an amount of 0.1 to 99.9 wt %, preferably of 1 to 80 wt %, based on the total weight of the composition.

In addition to the compound represented by Formula 1 and/or the compound represented by Formula 2, the liquid crystal composition according to the present invention may include other various compounds, which can be mixed without disturbing liquid crystal properties. Examples of such compounds include a polymerizable liquid crystal compound, a polymerizable non-liquid crystal compound, and a polymer, which are currently used in a conventional liquid crystal composition, and may be used at various ratios as desired. It is preferable that each of the polymerizable compounds has a polymerizable group, such as a vinyl group, a vinyloxy group, an acrylic group, or a methacrylic group.

The liquid crystal composition according to the present invention may include a photoreaction initiator as required, and herein, the photoreaction initiator may include conventional initiators known in the art without any particular limitation. Non-limiting examples of the photoreaction initiator include benzoyl ether, benzoyl isobutyl ether, benzoyl isopropyl ether, benzophenone, acetophenone, 4-benzoyl-4'-methyl diphenyl sulfide, benzyl methyl ketal, dimethylamino methyl benzoate, 3,3'-dimethyl-4-methoxybenzophenone, methyl benzoylformate, 2-methyl-1-(4-methylthio)phenyl)-2-morpholinopropane-1-one, 2-benzyl-2-dimethylamino-1-(4-morpholinophenyl)-butane-1-one, 1-hydroxycyclohexyl phenyl ketone, Irgacure based, etc. Also, the photoreaction initiator may be added in an amount of 0.001 to 20 parts by weight, preferably 0.01 to 10 parts by weight, based on 100 parts by weight of a polymerizable liquid crystal compound.

Also, the liquid crystal composition according to the present invention may include an organic solvent as required. The inclusion of the organic solvent facilitates the application (coating) of the liquid crystal composition on a substrate such as a film.

Herein, as the organic solvent, conventional organic solvents known in the art may be used without any particular limitation. Non-limiting examples of the organic solvent include: hydrocarbons such as cyclohexane, cyclopentane, benzene, toluene, xylene, butylbenzene, etc.; ketones such as acetone, methyl ethyl ketone, methyl isobutyl ketone, cyclohexanone, etc.; esters such as ethyl acetate, ethylene glycol monomethyl ether acetate, propylene glycol monomethyl ether acetate, gamma-butyrolactone, etc.; amides such as 2-pyrrolidone, N-methyl-2-pyrrolidone, dimethyl formamide, dimethylacetamide, etc.; halogens such as chloroform, dichloromethane, carbon tetrachloride, dichloroethane, tetrachloroethane, tetrachloroethylene, chlorobenzene, etc.; alcohols such as t-butyl alcohol, diacetone alcohol, glycerin, monoacetin, ethylene glycol, triethylene glycol, hexylene glycol, ethylene glycol monomethyl ether, etc.; phenols such as phenol, parachlorophenol, etc.; and ethers such as methoxybenzene, 1,2-dimethoxybenzene, diethylene glycol dimethyl ether, ethylene glycol dimethyl ether, ethylene glycol diethyl ether, propylene glycol dimethyl ether, propylene glycol diethyl ether, diethylene glycol dimethyl ether, diethylene glycol diethyl ether, dipropylene glycol dimethyl ether, dipropylene glycol diethyl ether, etc. Also, such an organic solvent can be independently used, or can be used by mixing at least two of these materials, and herein, the usage amount is not limited.

Also, the liquid crystal composition according to the present invention may include a surfactant as required. A surfactant allows a liquid crystal composition to be easily applied on a substrate. As the surfactant, conventional surfactants known in the art may be used without any particular limitation, and the additional amount varies according to the kind of surfactant, the composition ratio of components of a liquid crystal composition, the kind of solvent, and the kind of substrate.

Also, the liquid crystal composition according to the present invention may include a chiral dopant or a leveling agent that prevents distortion of a spiral structure of liquid crystal or reverse distortion of liquid crystal, etc. as an additional additive.

The liquid crystal composition according to the present invention may be prepared in a conventional manner. Typically, in the preparation, various components are dissolved at room temperature or high temperature.

The present invention provides an optical film using the liquid crystal composition according to the present invention.

The optical film according to the present invention is manufactured by forming an optically anisotropic layer, that is, a liquid crystal film, on a substrate. Herein, a liquid crystal alignment state in the liquid crystal film can be adjusted by appropriately selecting a polymerizable liquid crystal compound forming a liquid crystal composition, and other compounds.

Non-limiting examples of the optical film according to the present invention include an A-plate type compensation film, a B-plate type compensation film, a (+)C-plate type compensation film, or a (−)C-plate type compensation film, etc.

In the optical film of the present invention, the substrate may be used without any particular limitation, so long as the liquid crystal film can be formed on its surface. Examples of such the substrate include a polymer film, a metal, or a glass, etc.

Non-limiting examples of the polymer film include polyimide, polyamide imide, polyamide, polyetherimide, polyetheretherketone, polyetherketone, polyketone sulfide, polyethersulfone, cycloolefin polymer, polysulfone, polyphenylene sulfide, polyphenylene oxide, polyethylene terephthalate, polybutylene terephthalate, polyethylene naphthalate, polyacetal, polycarbonate, polyacrylate, acrylic resin, polyvinyl alcohol, polypropylene, cellulose, triacetyl cellulose, epoxy resin, phenol resin, etc., and herein the examples may be a uniaxially oriented film or a biaxially oriented film. Also the polymer film may be used after surface treatment such as hydrophilic treatment or hydrophobic treatment, and may be a laminated film. Also, non-limiting examples of the metal include aluminum, iron, copper, etc., which have slit-shaped surface grooves; and non-limiting examples of the glass include alkali glass, boric glass, print glass, etc., which have slit-shaped surfaces through etching.

Also, the substrate may have an alignment layer thereon. Non-limiting examples of a material for the alignment layer include polyimide, polyamide, polyacrylate, polyvinyl alcohol, etc.

Some of the substrate materials can be directly used due to sufficient capability of aligning a liquid crystal compound. However, in order to enhance alignment capability, the substrate materials may be subjected to separate treatment, such as rubbing, stretching, polarization irradiation, or skew ray irradiation, before being used as the substrate.

Herein, the rubbing can be directly performed on a substrate, or can be performed on an alignment layer previously formed on a substrate.

The optical film according to the present invention may be fabricated by common methods well known in the art. As an example, the optical film of the present invention may be fabricated by coating the inventive liquid crystal composition on a substrate, drying the coated liquid crystal composition to thereby aligning the liquid crystal compound, and then curing the aligned liquid crystal compound while maintaining the alignment form of the liquid crystal compound to thereby fix the alignment form.

The coating of a liquid crystal composition on a substrate may be performed in a conventional manner. Non-limiting examples of such a coating include spin coating, roll coating, printing, dip-drawing coating, curtain coating, die coating, dip coating, etc.

The drying process may be performed in a conventional manner, and herein, a liquid crystal compound is aligned during the drying process or is aligned by additionally heating after the drying process. The conditions of drying vary according to a boiling point of an organic solvent used for a liquid crystal composition, and materials for a substrate and an alignment layer, without any particular limitation. Also, it is possible to dry by heating, or to gradually dry at room or low temperature.

The curing process may be performed by irradiating rays and/or heat-treating on a coated liquid crystal composition. In the process, polymerization is carried out by a polymerizable group of a polymerizable compound, and a liquid crystal compound with a fixed alignment is attached on a substrate, thereby forming a liquid crystal film with an optically anisotropic layer. The wavelengths of the rays used for the curing process may include, but are not limited to, electron beams, ultraviolet rays, visible rays, infrared rays, etc. Also, the heat-treating is generally performed at 10~200° C. from 3 seconds to 30 minutes, but the conditions of the heat-treating are not limited to this.

Also, the optical film according to the present invention may be manufactured by coating a liquid crystal composition on a peelable film, drying the composition, forming a liquid crystal film through a curing process, and transferring the formed liquid crystal film to a substrate by using a gluing agent or adhesives.

The optical film according to the present invention may be used as an optical compensation film or a polarizer using the optical compensation film, and may be provided in a liquid crystal display.

Reference will now be made in detail to the preferred embodiments of the present invention. However, the following examples are illustrative only, and the scope of the present invention is not limited thereto.

EXAMPLE 1

-continued

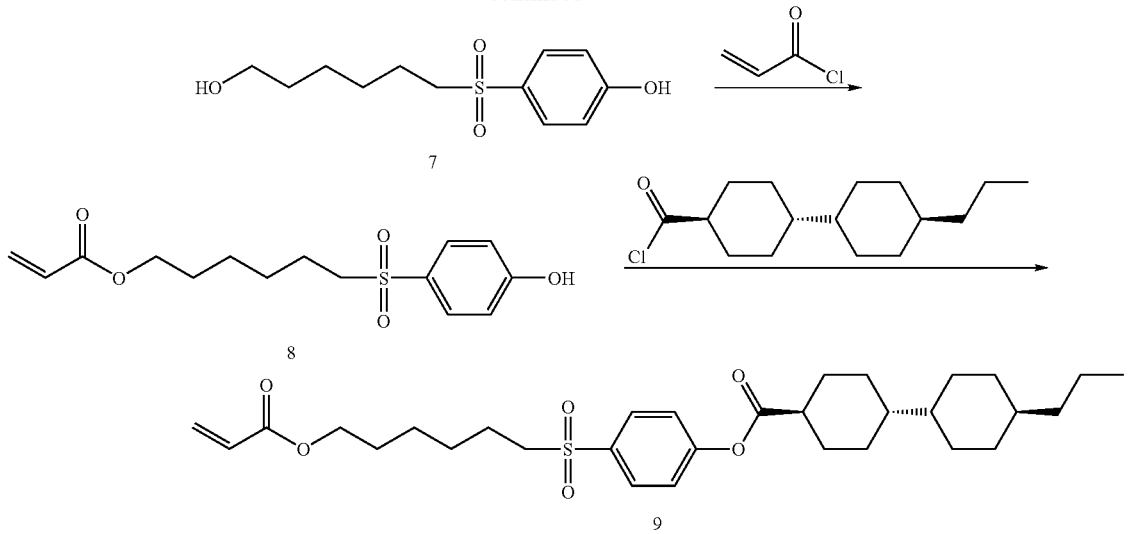

First, 1 equivalent of K₂CO₃, 1 equivalent of 4-hydroxythiophenol, and 1 equivalent of hexyl iodide silyl ether were dissolved in butanone as a solvent, and then the reaction mixture was stirred at room temperature for about 40 hours. After completion of the reaction, the resultant product was worked up with water and ether, and then was separated using silica gel to thereby obtain Compound 6 at a yield of about 80%. Compound 6 was dissolved in CH₂Cl₂ as a solvent, 2.2 equivalents of mCPBA was added thereto at 0° C., and then the reaction mixture was subjected to slow oxidation. The resultant product was worked up with water and CH₂Cl₂, and then was subjected to deprotection with a 10% aqueous solution of HCl while the solvent was replaced by THF to thereby obtain Compound 7 at a yield of about 70%. Compound 7 was dissolved in DMAc as a solvent, 1 equivalent of acryloyl chloride was added thereto at 0° C., the temperature of the reaction mixture was elevated to room temperature, and then the reaction mixture was stirred for about 1 hour. After completion the reaction, the resultant product was worked up with water and ether, and then was separated using silica gel to thereby obtain Compound 8 at a yield of 85% or greater. Compound 8 was dissolved in anhydrous THF as a solvent, 1 equivalent of trans, trans-4-(4'-n-propylcyclohexyl) cyclohexanecarboxylic acid chloride and 1.1 equivalents of diisopropylethylamine were added thereto, and then the reaction mixture was stirred at room temperature for about 10 hours. After completion of the reaction, the resultant product was worked up with water and ether, and then was separated using silica gel to thereby obtain a final compound, that is, Compound 9, at a yield of 90% or greater. ¹HNMR (400 MHz, CDCl₃): δ 0.89 (t, 3H), 0.91~1.25 (m, 8H), 1.26~1.40 (m, 10H), 1.48~1.78 (m, 9H), 1.80~1.90 (d, 2H), 2.11~2.19 (d, 2H), 2.39~2.51 (m, 1H), 3.71 (t, 2H), 4.15 (t, 2H), 5.84 (d, 1H), 6.14 (dd, 1H), 6.42 (d, 1H), 7.50 (d, 2H), 7.81 (d, 2H).

EXAMPLE 2

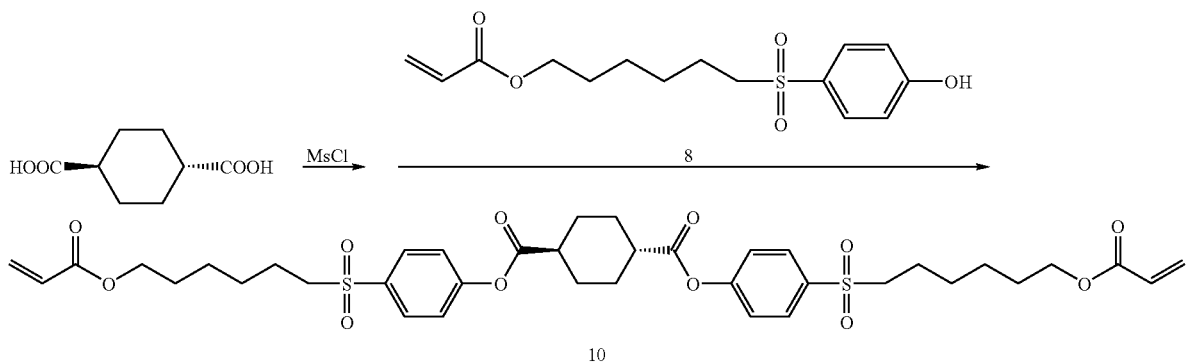

First, in the present of CH₂Cl₂ (solvent), 1 equivalent of trans-1,4-cyclohexanedicarboxylic acid was dissolved in anhydrous THF as a solvent, 2.2 equivalents of MsCl and 2.2 equivalents of diisopropylethylamine were added thereto, and then the reaction mixture was stirred for about 30 minutes to thereby obtain a diacid chloride compound. 2 equivalents of Compound 8 and 2.2 equivalents of diisopropylethylamine were added to the obtained diacid chloride compound, and then the reaction mixture was stirred at room temperature under a nitrogen atmosphere for about 10 hours. After completion of the reaction, the resultant product was worked up with water and ether, and then was separated using silica gel to thereby obtain a final compound, that is, Compound 10, at a yield of 80%. ¹HNMR (400 MHz, CDCl₃): δ 1.78~1.91 (d, 4H), 2.10~2.21 (d, 4H), 2.38~2.51 (m, 2H), 3.71 (t, 4H), 4.13 (t, 4H), 5.84 (d, 2H), 6.15 (dd, 2H), 6.42 (d, 2H), 7.51 (d, 4H), 7.80 (d, 4H).

EXAMPLE 3

Liquid Crystal Composition 1

Liquid Crystal Composition 1 was prepared according to the following composition:

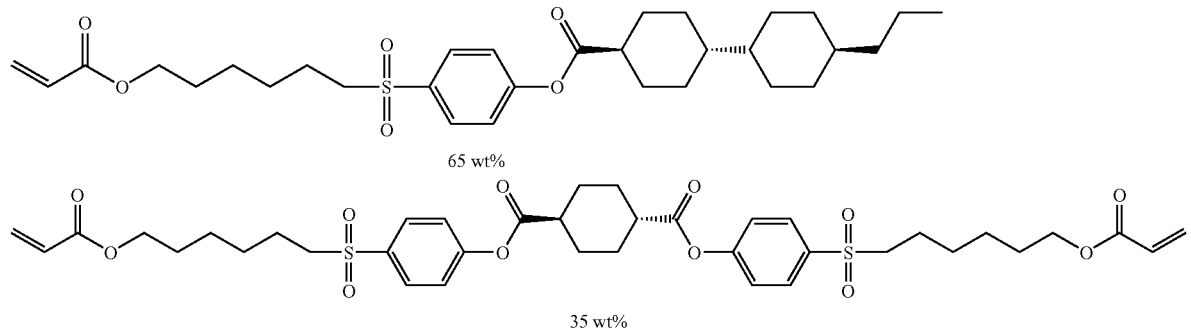

65 wt%

35 wt%

EXAMPLE 4

Liquid Crystal Composition 2

Liquid Crystal Composition 2 was prepared according to the following composition:

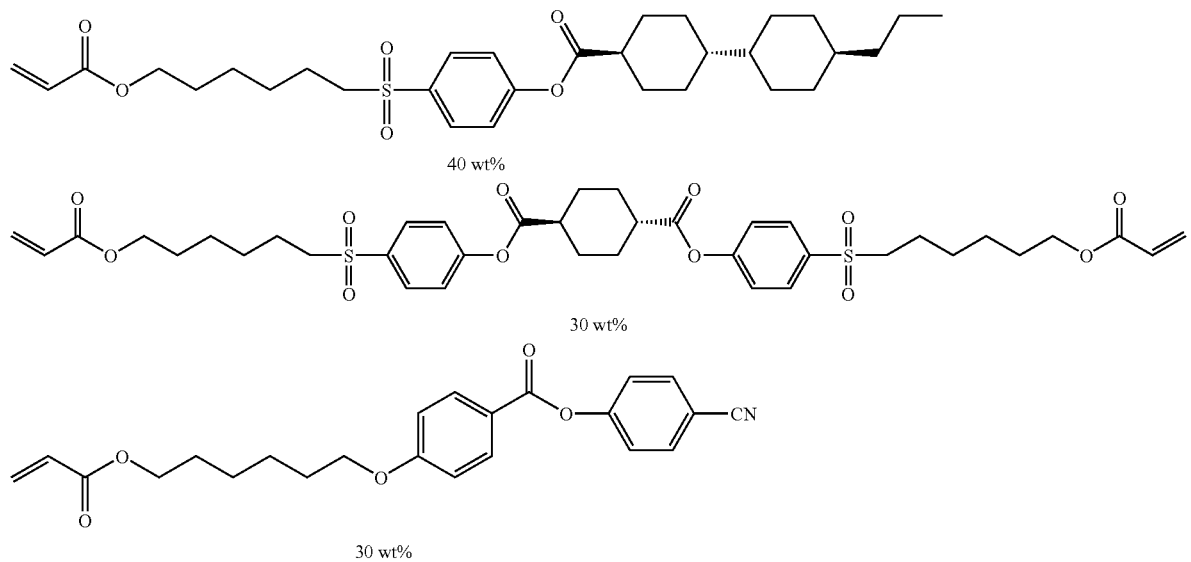

40 wt%

30 wt%

30 wt%

EXAMPLE 5

Liquid Crystal Composition 3

Liquid Crystal Composition 3 was prepared according to the following composition:

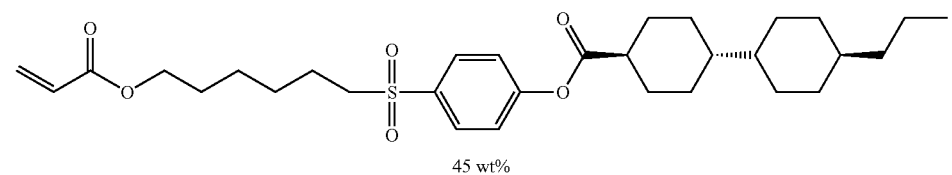

45 wt%

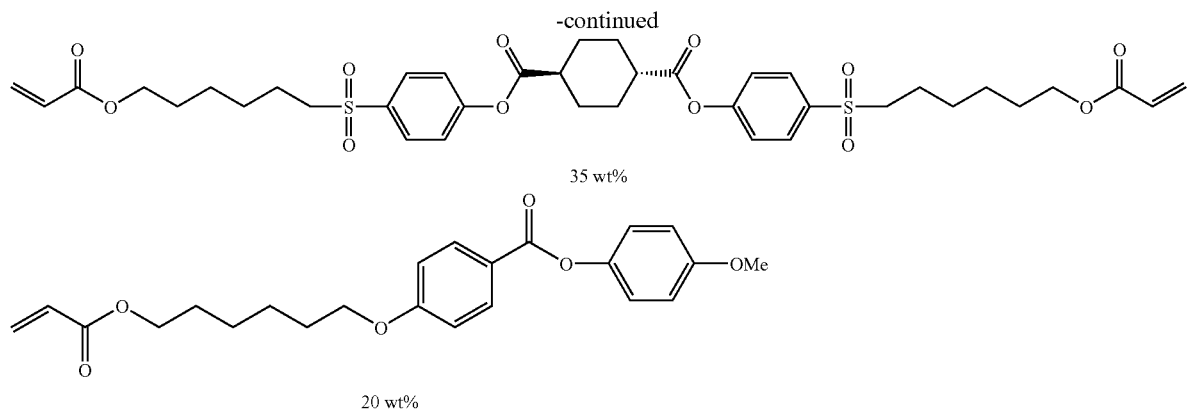

35 wt%

20 wt%

EXAMPLE 6

Fabrication of +C Type Compensation Film

First, 9.28 g of Liquid Crystal Composition 1 prepared according to Example 3 was dissolved in 15 g of toluene and 15 g of xylene, 600 mg of Irgacure 907 (2-methyl-4'-(methylthio)-2-morpholinophenone), 40 mg of FC-4430 as an alignment promoter, and 80 mg of BYK-300 as a leveler were added thereto, and then the reaction mixture was shaken sufficiently. After complete dissolution occurred in the reaction mixture, a solution free of particles was prepared using a particle filter. The resultant solution was bar-coated onto an oriented COP (cycloolefin polymer) with a thickness of 80 μm, which had been treated with an alignment layer, by using a wire-bar. The coated COP was dried in an oven at 50° C. for 1 minute, and then was subjected to UV (200 W~80 W/m) irradiation to thereby provide a +C type compensation film.

EXAMPLE 7

Fabrication of +C Type Compensation Film

A +C type compensation film was fabricated in the same manner as described in Example 6, except that Liquid Crystal Composition 2 prepared according to Example 4 was used instead of Liquid Crystal Composition 1 prepared according to Example 3.

EXAMPLE 8

Fabrication of +C Type Compensation Film

A +C type compensation film was fabricated in the same manner as described in Example 6, except that Liquid Crystal Composition 3 prepared according to Example 5 was used instead of Liquid Crystal Composition 1 prepared according to Example 3.

COMPARATIVE EXAMPLE 1

Fabrication of +C Type Compensation Film

A +C type compensation film was fabricated in the same manner as described in Example 6, except that Merck RM257 was used instead of Liquid Crystal Composition 1 prepared according to Example 3. After the coating was dried, the so-called dewetting occurred. Also, a white turbid and non-uniform film was formed after curing.

[Determination of Physical Properties of Compensation Films]

Each of the compensation films fabricated according to Examples 6 to 8 was determined for its thickness and refractive index.

More specially, the coatability of the film was evaluated using a polarizing microscope, the thickness of the film was measured using a micro-gauge, and the birefringence index of the film were measured at a mean wavelength of 550 nm by using an Abbe refractometer. The results of the physical properties are shown below in Table 1.

TABLE 1

| Compensation film | Thickness (μm) | In-plane refractive index ($n_{x,y}$) | Out-of-plane refractive index ($n_z$) | Birefringence Index (Δn) |
|---|---|---|---|---|
| Ex. 6 | 1 | 1.486 | 1.595 | 0.109 |
| Ex. 7 | 1 | 1.484 | 1.605 | 0.121 |
| Ex. 8 | 1 | 1.487 | 1.612 | 0.125 |

It can be noted from Table 1 that each of the compensation films fabricated using the liquid crystal composition of the present invention is excellent in film coatability, is formed as a transparent film after curing, and provides a uniform film with a birefringence index (Δn) of 0.109 to 0.125. However, since the compensation film fabricated according to Comparative Example 1 had poor surface quality, the film thickness and refractive index were not measured as a constant value, and the reliability of the measured data was very low, so the result values thereof are not presented in Table 1.

FIG. 1 illustrates a polarizing microscopic photograph of the compensation film fabricated according to Example 6, which is in a black state.

In general, a compensation film is used to prevent light leakage in a black state. Since the degree of black color in the black state is important in contrast and a viewing angle, it can be said that the purer the black color, the better the compensation film. Therefore, with reference to the pure black state photograph taken by a polarizing microscope shown in FIG. 1, the surface quality and the alignment state of the film according to Example 7 are determined, and accordingly, it is determined that the film has an excellent alignment state, and thus is suitable for an optical compensation film.

INDUSTRIAL APPLICABILITY

As can be seen from the foregoing, the compound according to the present invention and the liquid crystal composition comprising the same have low refractive anisotropy properties. Additionally, a high-quality viewing angle compensation film, which improves a contrast ratio measured at a tilt angle when compared to a contrast ratio measured from the front surface, and minimizes color variations in a black state depending on viewing angles, can be fabricated by using the liquid crystal composition according to the present invention.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A compound represented by the following Formula 1:

[Formula 1]

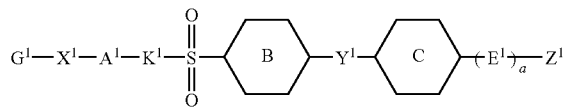

wherein $G^1$ is

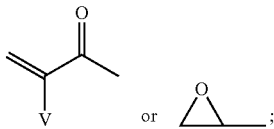

V is —H, —$CH_3$, —$CH_2CH_3$, —F, —Cl, —Br, or —$CF_3$;
$X^1$ is —O—, —NH—, a $C_1$~$C_{12}$ alkylene, or a single bond;
$A^1$ is a $C_1$~$C_{12}$ alkylene, a $C_2$~$C_{12}$ alkenylene, —($CH_2CH_2O)_n$—, —($CH_2CHCH_3O)_n$—, or —($CHCH_3CH_2O)_n$—, and n is an integer of 1 to 5;
$K^1$ is —O—, —NH—, a $C_1$~$C_{12}$ alkylene, or a single bond;
$Y^1$ is —O—, —NH—, a $C_1$~$C_{18}$ alkylene, —CH=CH—, —C≡C—, —($CH_2)_oC(=O)O(CH_2)_p$—, —($CH_2)_oOC(=O)(CH_2)_p$—, —($CH_2)_oC(=O)(CH_2)_p$—, —($CH_2)_oC(=O)NH(CH_2)_p$—, —($CH_2)_oNHC(=O)(CH_2)_p$—, or a single bond;
o and p are each independently an integer of 0 to 2;

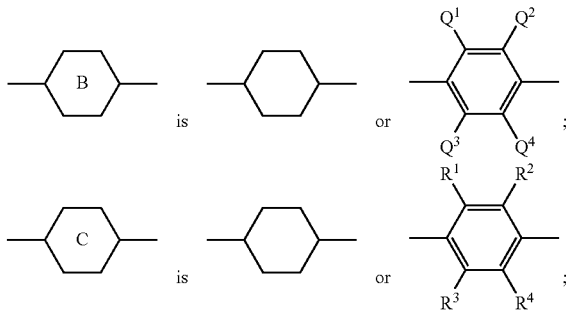

$E^1$ is

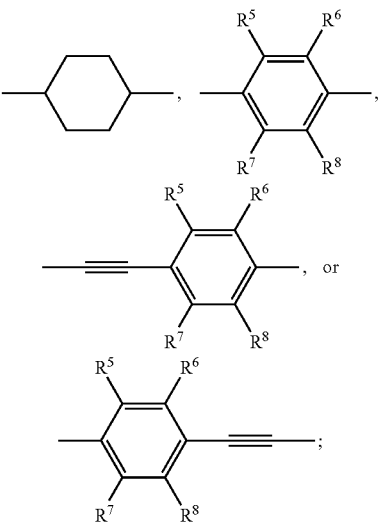

a is an integer of 0 to 2;
$Q^1$~$Q^4$ and $R^1$~$R^8$ are each independently —H, —F, —Cl, —Br, —I, —CN, —OH, —$CH_3$, —$CH_2CH_3$, —$CF_3$, or —C(=O)$CH_3$; and
$Z^1$ is —H, —F, —Cl, —Br, —I, —$CF_3$, —CN, —OH, —$OCH_3$, —$OCH_2CH_3$, —$OCF_3$, a $C_1$~$C_{12}$ alkyl, or a $C_2$~$C_{12}$ alkenyl.

2. The compound as claimed in claim 1, wherein the $C_2$~$C_{12}$ alkenylene as $A^1$ is selected from the group consisting of —CH=CH—, —CH=$CCH_3$—, —$CH_2$CH=CH—, —CH=CH$CH_2CH_2$—, —$CH_2$CH=CH$CH_2$—, —$CH_2CH_2$CH=CH—, —CH=CH$CH_2CH_2CH_2$—, —$CH_2$CH=CH$CH_2CH_2$—, —$CH_2CH_2$CH=CH$CH_2$—, and —$CH_2CH_2CH_2$CH=CH—, and the $C_2$~$C_{12}$ alkenyl as $Z^1$ is selected from the group consisting of —CH=$CH_2$, —CH=CH$CH_3$, —$CH_2$CH=$CH_2$, —CH=CH$CH_2CH_3$, —$CH_2$CH=CH$CH_3$, —$CH_2CH_2$CH=$CH_2$, —CH=CH$CH_2CH_2CH_3$, —$CH_2$CH=CH$CH_2CH_3$, —$CH_2CH_2$CH=CH$CH_3$, and —$CH_2CH_2CH_2$CH=$CH_2$.

3. The compound as claimed in claim 1, which is prepared by way of the following Reaction Scheme 1:

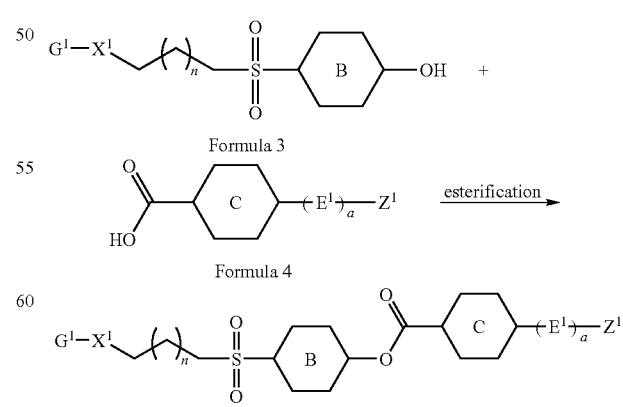

wherein $G^1$, $X^1$, $E^1$, a, $Z^1$, ring B, and ring C are as defined in claim 1, and n is an integer of 1 to 10.

4. The compound as claimed in claim 3, wherein a compound represented by Formula 3 is prepared by way of the following Reaction Scheme 2:

[Reaction Scheme 2]

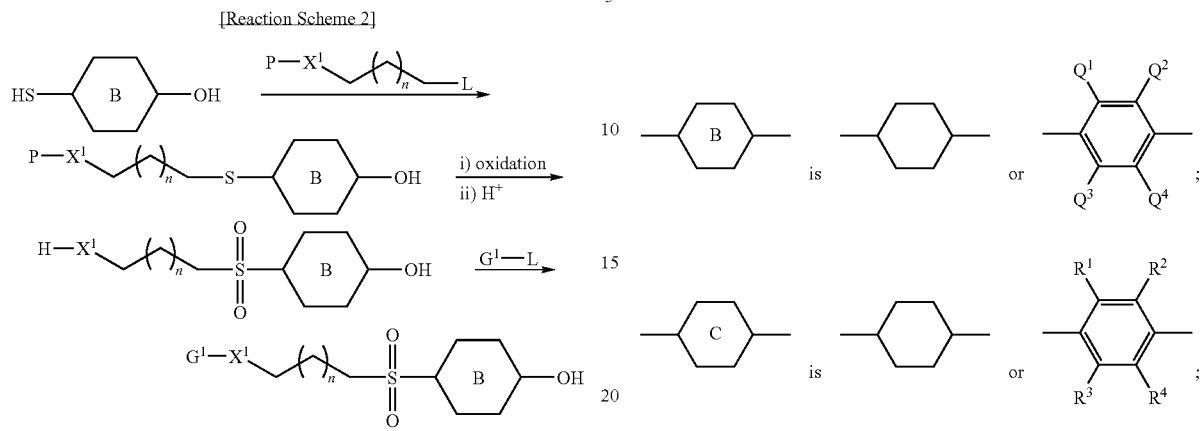

wherein $G^1$, $X^1$, and ring B are as defined in claim 1, and n is an integer of 1 to 10.

5. A liquid crystal composition comprising a compound represented by the following Formula 1 and/or a compound represented by the following Formula 2:

[Formula 1]

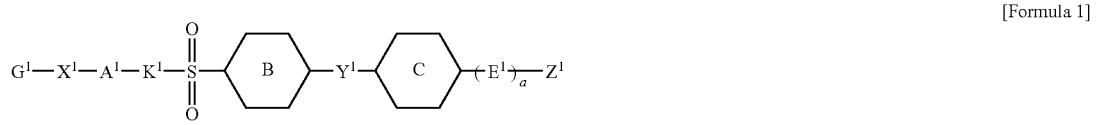

[Formula 2]

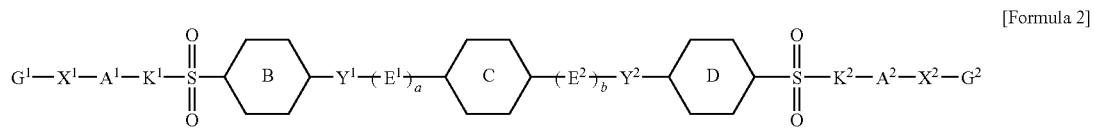

wherein $G^1$ and $G^2$ are each independently

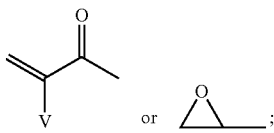

V is —H, —CH$_3$, —CH$_2$CH$_3$, —F, —Cl, —Br, or —CF$_3$;
$X^1$ and $X^2$ are each independently —O—, —NH—, a $C_1$~$C_{12}$ alkylene, or a single bond;
$A^1$ and $A^2$ are each independently a $C_1$~$C_{12}$ alkylene, a $C_2$~$C_{12}$ alkenylene, —(CH$_2$CH$_2$O)n-, —(CH$_2$CHCH$_3$O)n-, or —(CHCH$_3$CH$_2$O)n-, and n is an integer of 1 to 5;
$K^1$ and $K^2$ are each independently —O—, —NH—, a $C_1$~$C_{12}$ alkylene, or a single bond;
$Y^1$ and $Y^2$ are each independently —O—, —NH—, a $C_1$~$C_{18}$ alkylene, —CH═CH—, —C≡C—, —(CH$^2$)o C(═O)O(CH$^2$)p-, —(CH$^2$)oOC(═O)(CH$^2$)p-, —(CH$^2$)oC(═O)(CH$^2$)p-, —(CH$^2$)oC(═O)NH(CH$^2$)p-, —(CH$^2$)oNHC(═O)(CH$^2$)p-, or a single bond;
o and p are each independently an integer of 0 to 2;

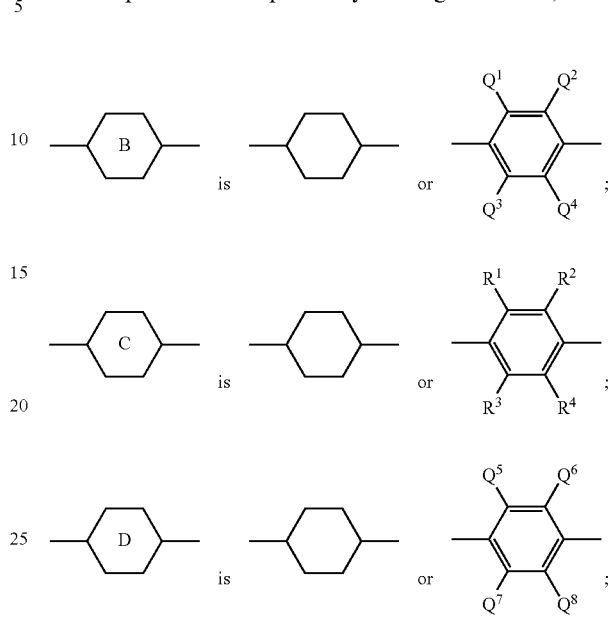

$E^1$ and $E^2$ are each independently

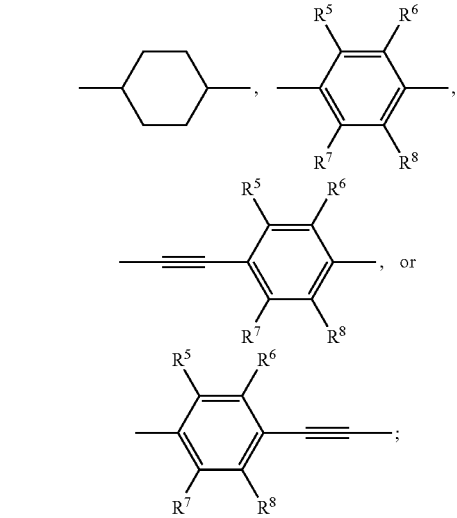

a and b are each independently an integer of 0 to 2; and $Q^1$~$Q^8$ and $R^1$~$R^8$ are each independently —H, —F, —Cl, —Br, —I, —CN, —OH, —CH$_3$, —CH$_2$CH$_3$, —CF$_3$, or —C(=O)CH$_3$; and $Z^1$ is —H, —F, —Cl, —Br, —I, —CF$_3$, —CN, —OH, —OCH$_3$, —OCH$_2$CH$_3$, —OCF$_3$, a $C_1$~$C_{12}$ alkyl, or a $C_2$~$C_{12}$ alkenyl.

6. The liquid crystal composition as claimed in claim 5, wherein in a compound having a stereoisomer from among the compounds represented by Formula 1, stereoisomer of the compound is present in a ratio of trans-isomer: cis-isomer of 85:15~100:0.

7. The liquid crystal composition as claimed in claim 5, wherein in a compound having a stereoisomer from among the compounds represented by Formula 2, stereoisomer of the compound is present in a ratio of trans-isomer: cis-isomer of 85:15~100:0.

8. The liquid crystal composition as claimed in claim 5, wherein the compound represented by Formula 1 and the compound represented by Formula 2 are each independently included in the liquid crystal composition in an amount of 1~80 wt % based on the total weight of the liquid crystal composition.

9. An optical film using a liquid crystal composition, the liquid crystal composition comprising a compound represented by the following Formula 1 and/or a compound represented by the following Formula 2:

—(CH$_2$)o C(=O)(CH$_2$)p-, —(CH$_2$)oC(=O)NH(CH$_2$)p-, —(CH$_2$)oNHC(=O)(CH$_2$)p-, or a single bond;

o and p are each independently an integer of 0 to 2;

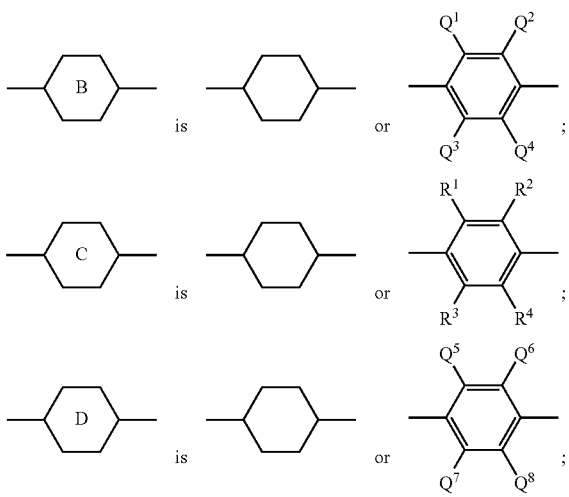

[Formula 1]

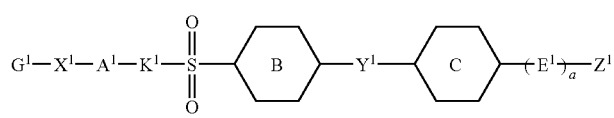

[Formula 2]

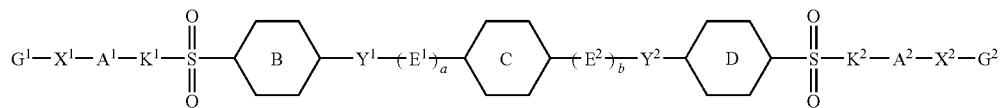

wherein $G^1$ and $G^2$ are each independently

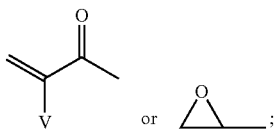

V is —H, —CH$_3$, —CH$_2$CH$_3$, —F, —Cl, —Br, or —CF$_3$;

$X^1$ and $X^2$ are each independently —O—, —NH—, a $C_1$~$C_{12}$ alkylene, or a single bond;

$A^1$ and $A^2$ are each independently a $C_1$~$C_{12}$ alkylene, a $C_2$~$C_{12}$ alkenylene, —(CH$_2$CH$_2$O)n-, —(CH$_2$CHCH$_3$O)n-, or —(CHCH$_3$CH$_2$O)n-, and n is an integer of 1 to 5;

$K^1$ and $K^2$ are each independently —O—, —NH—, a $C_1$~$C_{12}$ alkylene, or a single bond;

$Y^1$ and $Y^2$ are each independently —O—, —NH—, a $C_1$~$C_{18}$ alkylene, —CH=CH—, —C≡C—, —(CH$_1$)o C(=O)O(CH$_2$)p-, —(CH$_2$)oOC(=O)(CH)p-, $E^1$ and $E^2$ are each independently

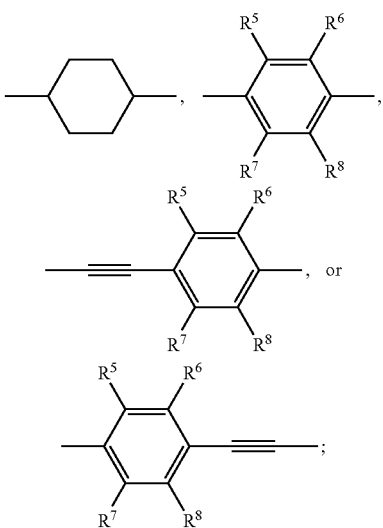

a and b are each independently an integer of 0 to 2; and $Q^1$~$Q^8$ and $R^1$~$R^8$ are each independently —H, —F, —Cl, —Br, —I, —CN, —OH, —CH$_3$, —CH$_2$CH$_3$, —CF$_3$, or —C(=O)CH3; and $Z^1$ is —H, —F, —Cl, —Br, —I, —CF$_3$, —CN, —OH, —OCH$_3$, —OCH$_2$CH$_3$, —OCF$_3$, a $C_1$~$C_{12}$ alkyl, or a $C_2$~$C_{12}$ alkenyl.

10. The optical film as claimed in claim 9, which is an A-plate type compensation film, a B-plate type compensation film, a (+)C-plate type compensation film, or a (−)C-plate type compensation film.

11. A liquid crystal display comprising the optical film as claimed in claim 9.

12. The optical film as claimed in claim 9, wherein in a compound having a stereoisomer from among the compounds represented by Formula 1, stereoisomer of the compound is present in a ratio of trans-isomer: cis-isomer of 85:15~100:0.

13. The optical film as claimed in claim 9, wherein in a compound having a stereoisomer from among the compounds represented by Formula 2, stereoisomer of the compound is present in a ratio of trans-isomer: cis-isomer of 85:15~100:0.

14. The optical film as claimed in claim 9, wherein the compound represented by Formula 1 and the compound represented by Formula 2 are each independently included in the liquid crystal composition in an amount of 1~80 wt % based on the total weight of the liquid crystal composition.

* * * * *